United States Patent Office 3,795,680
Patented Mar. 5, 1974

3,795,680
2-TRIFLUOROMETHYLBENZIMIDAZOLES
Dennis Ernest Burton, Ickleton, near Saffron Walden, Alan James Lambie, Kidderminster, and Geoffrey Tatttersall Newbold, Saffron Walden, England, assignors to Fisons Limited, London, England
No Drawing. Continuation-in-part of application Ser. No. 476,185, July 30, 1965, which is a continuation-in-part of application Ser. No. 343,225, Feb. 7, 1964, both now abandoned. This application May 3, 1971, Ser. No. 139,826
Claims priority, application Great Britain, Feb. 16, 1963, 6,372/63
Int. Cl. C07d 49/38
U.S. Cl. 260—309.2
5 Claims

ABSTRACT OF THE DISCLOSURE

Benzimidazole compounds of the formula:

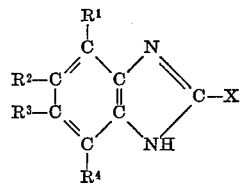

and salts thereof, where in the above formula $R^1$, $R^2$, $R^3$ and $R^4$ may be the same or different and are selected from the group comprising hydrogen, alkyl (for example 1–6 carbon atoms such as methyl, ethyl or propyl), hydroxy, alkoxy (for example methoxy, ethoxy or butoxy), nitro, halogen (for example chloro, bromo or fluoro), pseudohalogen (for example cyano, thiocyano, isothiocyano or azido), substituted alkyl (for example, trifluoromethyl, chloromethyl, bromoethyl, trichloromethyl, hydroxymethyl, 2-chloroethyl, 2-hydroxyethyl or 2-methoxyethyl), carboxy, carboxy ester, carboxy amide, N-substituted carboxy amide, N-disubstituted carboxy amide, amino (for example methylamino, dimethylamino, acetylamino, trifluoroacetylamino, benzenesulphonamido, paratoluenesulphonamido, methanesulphonamido), thiol, alkylthiol, and oxygenated derivatives thereof (for example —SOR⁵ or —SO₂R⁵ where R⁵ is alkyl), sulphonic acid and esters and amides thereof, substituted amide (for example, phenylsulphamyl, ethylsulphamyl, chloroethylsulphamyl), radicals and where X is trifluoromethyl or pentafluoroethyl, possess physiological activity and are useful in the formulation of physiologically active compositions.

This application is a continuation-in-part of application Ser. No. 476,185, filed July 30, 1965, now abandoned, which application in turn is a continuation-in-part of application Ser. No. 343,225, filed on Feb. 7, 1964, now abandoned.

The present invention relates to certain substituted benzimidazoles which have been found to possess physiological activity.

It has been found that the substituted benzimidazoles as hereinafter described are active in many fields and that certain members are highly active as herbicides, insecticides, molluscicides and fungicides.

Accordingly the present invention relates to substituted benzimidazole compounds of the following formula:

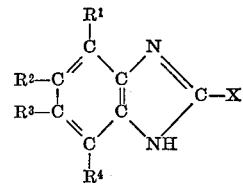

(hereinafter called Formula I) and salts thereof, where in the above formula $R^1$, $R^2$, $R^3$ and $R^4$ may be the same or different and are selected from the group comprising hydrogen, lower alkyl (for example 1–6 carbon atoms such as methyl, ethyl or propyl), hydroxy, lower alkoxy (for example methoxy, ethoxy or butoxy), nitro, halogen (for example chloro, bromo or fluoro), pseudohalogen (for example cyano, thiocyano, isothiocyano or azido), substituted alkyl (for example trifluoromethyl, halo lower alkyl, chloromethyl, bromomethyl, trichloromethyl, hydroxymethyl, 2-chloroethyl, 2-hydroxyethyl or 2-methoxyethyl), carboxy, carboxy ester, carboxy amide, N-substituted carboxy amide, N-disubstituted carboxy amide, amino or mono- or disubstituted amino (for example methylamino, dimethylamino, acetylamino, trifluoroacetylamino, benzenesulphonamido, paratoluenesulphonamido, methanesulphonamido), thiol, alkylthiol, and oxygenated derivatives thereof (for example —SOR⁵ or —SO₂R⁵ where R⁵ is alkyl), sulphonic acid and esters and amides thereof, substituted amide (for example phenylsulphamyl, ethylsulphamyl, chloroethylsulphamyl), radicals and where X is trifluoromethyl or pentafluoroethyl.

The present invention also provides the salts of the substituted benzimidazoles of the formula indicated above as new compounds. For purposes of this invention the salts are the equivalents of the compounds.

The present invention also comprises the new substituted benzimidazoles of Formula I, wherein $R^1$, $R^2$, $R^3$, $R^4$ and X have the significance indicated above excluding those cases where X is trifluoromethyl and where $R^1$ is hydrogen, methyl, trifluoromethyl, or carboxy, or where $R^2$ is fluoro, chloro, methyl, trifluoromethyl, methoxy or nitro, or where $R^1$ and $R^2$ are both methyl or trifluoromethyl, or where $R^1$ and $R^4$ are the same and are methyl or ethoxy, or where $R^2$ and $R^3$ are both methyl, when the remaining groups $R^1$ to $R^4$ are hydrogen, or where $R^1$, $R^2$, $R^3$ and $R^4$ are all fluoro groups, and excluding those cases where X is pentafluoroethyl and either where $R^1$–$R^4$ are all hydrogen or where $R^2$ is fluorine and $R^1$, $R^3$ and $R^4$ are hydrogen, or where $R^1$ and $R^4$ are methyl and $R^2$ and $R^3$ are hydrogen.

Salts of the substituted benzimidazoles embraced by the present invention may comprise ammonium salts, metal salts such as for example sodium potassium, calcium, zinc, copper and magnesium salts, amine salts such as for example methylamine, ethylamine, dimethylamine, triethylamine, ethanolamine, triethanolamine and benzylamine salts. According to a preferred embodiment the salts are alkali metal salts. Generally the alkali metal salts are crystalline solids, readily soluble in water.

The salts may be prepared by reacting the benzimidazole in aqueous or aqueous-organic solvent solution or suspension with an alkaline compound of the metal, such as the hyroxide, or with the amine, as appropriate. The metal salts may also be prepared by metathesis for example between the alkali metal salt of the benzimidazole and a salt of the metal. Some of the benzimidazoles are also basic and can form salts with strong acids such as hydrochloric acid.

It has been found that the substituted benzimidazoles according to the invention generally possess physiological activity. Many of these compounds are useful as herbicides having post-emergent activity as well as some pre-emergent activity, or as insecticides, or as molluscicides, or as fungicides.

The use of the active compounds in protecting keratinic material against insect attack, e.g., mothproofing, is the invention of the inventors Newbold et al. and is disclosed and claimed in application Ser. No. 529,248, filed Feb. 23, 1966, now U.S. Pat. 3,542,923.

According to one embodiment, the invention provides the following compounds, which are especially active as herbicides:

4,5-dichloro-2-trifluoromethyl benzimidazole,
4,6-dichloro-2-trifluoromethyl benzimidazole,
4,5,7-trichloro-2-trifluoromethyl benzimidazole,
4,5,6-trichloro-2-trifluoromethyl benzimidazole,
4-nitro-5-bromo-2-trifluoromethyl benzimidazole,
5-chloro-6-nitro-2-trifluoromethyl benzimidazole,
4-nitro-6-chloro-2-trifluoromethyl benzimidazole,
4,5,7-tribromo-2-trifluoromethyl benzimidazole,
4-chloro-6-nitro-2-trifluoromethyl benzimidazole,
4-nitro-2-trifluoromethyl benzimidazole,
4-chloro-2-trifluoromethyl benzimidazole,
4,6-dibromo-2-trifluoromethyl benzimidazole,
5-cyano-2-trifluoromethyl benzimidazole,
4-bromo-6-chloro-2-trifluoromethyl benzimidazole,
5-bromo-2-trifluoromethyl benzimidazole,
4-chloro-6-bromo-2-trifluoromethyl benzimidazole,
5-iodo-2-trifluoromethyl benzimidazole,
4-bromo-6-nitro-2-trifluoromethyl benzimidazole, and
4,6-nitro-2-trifluoromethyl benzimidazole.

According to another embodiment, the invention provides the following compounds, which are especially active as insecticides, both agriculturally (in the treatment of plants, the soil, etc.) and industrially (in the treatment of inanimate matter such as textiles, wood, paper, etc.).

4-chloro-2-trifluoromethyl benzimidazole,
4,7-dichloro-2-trifluoromethyl benzimidazole,
4-nitro-6-chloro-2-trifluoromethyl benzimidazole,
4-nitro-6-bromo-2-trifluoromethyl benzimidazole,
4-bromo-5,6,7-trichloro-2-trifluoromethyl benzimidazole,
4-bromo-2-trifluoromethyl benzimidazole,
4-nitro-2-trifluoromethyl benzimidazole,
5-nitro-2-trifluoromethyl benzimidazole,
4,6,7-trichloro-2-trifluoromethyl benzimidazole,
4,5,6-trichloro-2-trifluoromethyl benzimidazole,
4,5,6,7-tetrabromo-2-trifluoromethyl benzimidazole,
4,6-diiodo-2-trifluoromethyl benzimidazole,
4,6,6-trichloro-5-bromo-2-trifluoromethyl benzimidazole,
5-chloro-6-nitro-2-trifluoromethyl benzimidazole,
4,6,7-trichloro-5-fluoro-2-trifluoromethyl benzimidazole,
4,5,6,7-tetrachloro-2-trifluoromethyl benzimidazole, and
4,6-dibromo-5,7-dichloro-2-trifluoromethyl benzimidazole.

With the compounds of Formula I, it has been found that compounds where at least 3 of the groups are halogen, are especially active as insecticides and mothproofing agents. Accordingly one embodiment of the invention is for compounds of Formula I and salts thereof, where $R^1$, $R^2$, $R^3$, $R^4$ and X have the significance indicated herein, but where at least three of the groups $R^1$, $R^2$, $R^3$ and $R^4$ are halogen.

According to a further embodiment, the present invention is for compounds of Formula I and salts thereof, where $R^1$, $R^2$, $R^3$, $R^4$ and X have the significance indicated herein, but where at least one of the groups $R^1$, $R^2$, $R^3$ and $R^4$ is halogen and not more than two of the groups $R^1$, $R^2$, $R^3$ and $R^4$ are hydrogen. According to a yet further embodiment, the present invention is for compounds of Formula I and salts thereof where $R^1$, $R^2$, $R^3$, $R^4$ and X have the significance indicated herein, but where at least one of the groups $R^1$, $R^2$, $R^3$ and $R^4$ is a cyano, amino, substituted amino, carboxyamide, thiol, sulphonic acid or a group attached to the ring through a sulphur atom, radical.

In one particular embodiment the invention provides compounds of the formula:

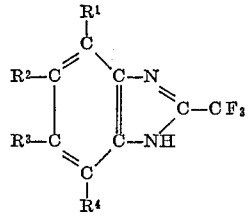

and salts thereof wherein $R^1$, $R^2$, $R^3$ and $R^4$ are the same or different and represent hydrogen or halogen with the proviso that when $R^2$ or $R^3$ is fluoro, chloro or hydrogen, the remaining members of $R^1$, $R^2$, $R^3$ and $R^4$ are not all hydrogen and with the further proviso that where $R^2$ or $R^3$ is fluoro, the remaining members of $R^1$, $R^2$, $R^3$ and $R^4$ are not all fluoro. Particular compounds which may be mentioned as falling within this group of compounds are as follows:

5,6-dichloro-2-trifluorobenzimidazole,
4,5-dichloro-2-trifluorobenzimidazole,
4,5,6-trichloro-2-trifluorobenzimidazole,
4-bromo-5,6-dichloro-2-trifluorobenzimidazole,
4,6-diiodo-2-trifluorobenzimidazole,
5-iodo-2-trifluorobenzimidazole.

In a further particular embodiment, the invention provides compounds of the formula

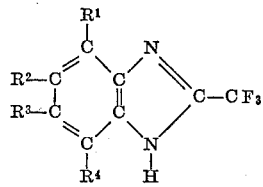

wherein $R^1$, $R^2$, $R^3$ and $R^4$ are the same or different and are selected from the group consisting of chloro, bromo and hydrogen, not more than two of $R^1$, $R^2$, $R^3$ and $R^4$ representing hydrogen.

The invention also provides compounds according to the immediate above formula wherein at least one of $R^1$, $R^2$, $R^3$ and $R^4$ is chloro and not more than two of said groups are hydrogen.

The substituted benzimidazoles bearing an amino group are prepared by the reduction of the corresponding nitro substituted benzimidazole.

The substituted benzimidazoles bearing nitro groups together with other substituents such as halogen are prepared by nitration of the corresponding substituted benzimidazole.

The substituted benzimidazoles as indicated are prepared by reacting the corresponding ortho-phenylenediamine with trifluoroacetic acid, trifluoro acetyl chloride or trifluoro acetic anhydride, or with pentafluoropropionic acid, pentafluoropropionyl chloride or pentafluoropropionic anhydride.

Many of the compounds according to the present invention possess fungicidal as well as insecticidal activity, and consequently the objects treated may also be rendered antifungal.

The compounds of the invention are of particular application in the treatment of inanimate matter for the purpose of destroying insects or rendering it resistant to insect attack. The materials so treated may comprise for example wood, paper, timber, fabrics, synthetic fibers, plastics, sacking, jute, grain, flour, paint and varnish compositions, adhesives, glues, materials of constructions, etc.

The process for the treatment of inanimate materials may comprise any method of contact or incorporated. Thus for example the materials may be sprayed, coated or impregnated with a solution or suspension containing the substituted benzimidazole, or if desired the material may be dipped in a bath containing said compound. Impregnation may be carried out for example at reduced pressure or at high pressure or at high temperature, if so desired. Where appropriate the substituted benzimidazole may be incorporated into the materials to be treated. Thus for example the substituted benzimidazole may be incorporated into paint, varnish or dye compositions; the resulting composition is resistant to insect attack as are articles painted or treated with them.

It is also possible to incorporate the substituted benzimidazole into synthetic fibers or plastics during manufacture. Thus for example, in the case of viscose, the substituted benzimidazole may be incorporated during manufacture by inclusion in the solution prior to coagulation and spinning. The compounds may also readily be incorporated in building materials such as plaster.

Many of the substituted benzimidazoles exhibit prolonged activity of the inanimate materials. The activity may persist for many months, or more, and in some cases is resistant to washing operations.

A specially preferred embodiment is the treatment of fibers, yarns and textiles for moth proofing and related purposes. As indicated, with the synthetic fibers, it is possible to incorporate the compounds during manufacture. With other fibers and textiles, the treatment according to the invention may be carried out in any of the conventional ways including dipping and spraying as a separate operation or combined with other treatments such as dyeing, flameproofing, waterproofing, etc. Dipping processes may be carried out in accordance with conventional methods. If desired, the treatment of textiles may be combined with a conventional washing operation.

The insects and pests against which the compounds of the present invention provide protection include flying insects such as flies, mosquitoes, butterflies, moths, beetles, aphids, etc., crawling pests such as larvae, caterpillars, spiders, beetles, etc.

Many of the salts of the substituted benzimidazoles embraced by the invention are water-soluble, and these may be used in physiologically active compositions as aqueous solutions with or without wetting or dispersing agents, organic solvents, stickers and the like which are commonly incorporated in sprays for agricultural and related purposes. However, it is generally preferred to use the salts of the substituted benzimidazole in association with a wetting agent.

If desired, the substituted benzimidazoles or salts thereof may be dissolved or dispersed in an organic solvent in which the substituted benzimidazole may be soluble or insoluble. Such solvents include natural vegetable oil, such as olive oil or arachis oil, or petroleum oils.

The substituted benzimidazoles or salts thereof may also be admixed with a wetting agent with or without an inert diluent to form a wettable powder which is soluble or dispersable in water, or may be mixed with the inert diluent to form a solid or powdery product.

Inert diluents with which the substituted benzimidazoles and salts thereof may be incorporated include solid inert media comprising powdered or divided solid materials, for example, clays, sands, talc, mica, fertilizers and the like, such products either comprising dust or large particle size materials.

The wetting agents used may comprise anionic compounds such as for example, soaps, fatty sulphate esters such as dodecyl sodium sulphate, fatty aromatic sulphonates such as alkyl-benzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

For molluscicidal use the benzimidazole may for example be made into a granule or pellet, for example of plaster of Paris, which may be scattered in an aquatic habitat of the molluscs, and from which the benzimidazole may be leached, or dissolved into a spreading oil such as diesel or lubricating oil with a wetting agent such as oleic acid, which may be applied to the water surface. The compounds of the present invention also provide a process for the purification of water by treatment in this way. Edible substances attractive to molluscs with which the benzimidazoles may be admixed include fungi, oilcake, fruit waste, lucerne flour, cereals, cereal products, vegetables, vegetable products, bran, biscuits and the like.

The physiologically active compositions may contain in addition to the substituted benzimidazole or salts thereof, other physiologically active materials such as herbicides, insecticides, fungicides and molluscicides.

The following examples are given to illustrate the present invention; the parts and percentages are by weight unless otherwise indicated.

EXAMPLE 1

50 parts of 3,4,5,6-tetrachloro-o-phenylenediamine and 62 parts of trifluoroacetic acid were heated for 16 hours at 100° C. with protection from the ingress of moisture. The excess trifluoroacetic acid and the water formed in the reaction were then removed under reduced pressure and the final traces removed by keeping over solid sodium hydroxide under high vacuum. The residual solid cake was powdered and heated with 3500 parts of boiling benzene. The boiling solution was filtered from a small amount of insoluble material treated with charcoal and set aside to crystallize. The product 4,5,6,7-tetrachloro-2-trifluoromethylbenzimidazole (33.3 parts; 50% yield) separated as fine needles, melting point 285° C., unchanged by further recrystallization.

*Analysis.*—Found (percent): C, 30.90; H, 0.30; Cl, 43.0; F, 17.10; N, 8.55. $C_8HCl_4F_3N_2$ requires (percent): C, 29.66; H, 0.31; Cl, 43.78; F, 17.60; N, 8.65.

EXAMPLES 2–3

In an analogous way to Example 1 the following compounds were prepared:

4,5,6-trichloro-2-trifluoromethylbenzimidazole (melting point 226–228° C.)
4,5,7-trichloro-2-trifluoromethylbenzimidazole (melting point 240–242° C.)
4-bromo-5,6-dichloro-2-trifluoromethylbenzimidazole (melting point 235–236° C.).

EXAMPLE 4

17.6 parts of 3,4-dichloro-o-phenylene diamine were heated overnight in a steam bath with 10 parts of trifluoroacetic acid. The ingress of moisture was prevented by use of a calcium chloride guard tube. The reaction mixture was then dissolved in 250 parts of a 10% sodium hydroxide solution which was then filtered to remove any insoluble material. By acidification of the alkaline filtrate, a red-brown solid was obtained, which was filtered off, washed with water and dried. The dried solid (23.5 parts) was then crystallized from 75% ethanol (charcoal) to yield 4,5-dichloro-2-trifluoromethylbenzimidazole as an off-white solid (17 parts 62% yield), melting point 213–4° C.

*Analysis.*—Found (percent): C, 37.95; H, 1.25; N, 11.05; Cl, 27.55. $C_8H_3Cl_2F_3N_2$ requires (percent): C, 37.67; H, 1.19; N, 10.98; Cl, 27.81.

EXAMPLES 5–16

In an analogous manner to Example 4 the following compounds were prepared:

4,6-dichloro-2-trifluoromethylbenzimidazole (melting point 175–7° C.)

4,7-dichloro-2-trifluoromethylbenzimidazole (melting point 273–4° C.)

4-nitro-6-chloro-2-trifluoromethylbenzimidazole (melting point 148–150° C.)

4-chloro-6-nitro-2-trifluoromethylbenzimidazole (melting point 206–8° C.)

5,6-dichloro-2-trifluoromethylbenzimidazole (melting point 244–5° C.)

4-bromo-5,6,7-trichloro-2-trifluoromethylbenzimidazole (melting point 260–272° C.)

4-chloro-2-trifluoromethylbenzimidazole (melting point 159–161° C.)

5,6-dimethoxy--trifluoromethylbenzimidazole hydrochloride (melting point 211–212° C.)

5,6-dinitro-2-trifluoromethylbenzimidazole (melting point 242–243° C.)

4,7-dibromo-2-trifluoromethylbenzimidazole (melting point 267–270° C.)

5-cyano-2-trifluoromethylbenzimidazole (melting point 192° C.)

4,6,7-trichloro-5-methyl-2-trifluoromethylbenzimidazole (sublimes above 145° C.).

EXAMPLES 17–20

16.4 parts of pentafluoropropionic acid were added to 10.5 parts of 3,4,5-trichloro-o-phenylene diamine and the mixture heated for 15 hours on a steam bath. The solid cake formed was stirred with 10% aqueous sodium hydroxide solution, and the insoluble unreacted diamine filtered off. The alkaline liquor was made almost neutral by the addition of concentration hydrochloric acid and then made just acid by the addition of glacial acetic acid. The brown oil obtained was extracted into benzene and the liquor clarified with charcoal. The benzene liquor was extracted with 0.880 ammonia and the alkaline extract neutralized with concentrated hydrochloric acid and made just acid with glacial acetic acid.

The precipitated product was filtered off and recrystallized from toluene to give 4,5,6-trichloro-2-pentafluoroethylbenzimidazole in a yield of 4 parts (25%), melting point 206–7.5° C.

*Analysis.*—Found (percent): N, 8.75; Cl, 32.40. $C_9H_2Cl_3F_5N_2$ requires (percent): N, 8.50; Cl, 32.28.

The following compounds were prepared in an analogous way:

5-nitro-2-pentafluoroethylbenzimidazole (melting point 140–1° C.)

4-nitro-6-chloro-2-pentafluoroethylbenzimidazole (melting point 113–5° C.)

4,6,7-trichloro-5-methyl-2-pentafluoroethylbenzimidazole (melting point 260–5° C.).

EXAMPLE 21

A herbicidal composition was prepared by grinding together 100 parts of 5-nitro-2-trifluoromethylbenzimidazole, 200 parts of chalk and 50 parts of sorbitan monooleate, forming a wettable powder. The wettable powder was dispersed in water for spraying purposes and was used as a post-emergent selective herbicide at a rate of 355 grams per hectare.

EXAMPLE 22

A herbicidal composition was made by preparing an aqueous concentrate of the sodium salt of 5-chloro-2-trifluoromethylbenzimidazole and Lissapel NX. This aqueous concentrate could be diluted with further water for spraying.

EXAMPLE 23

Peas, mustard, linseed, buckwheat, sugarbeet, barley, mayweed and chickweed were grown in John Innes No. 1 potting compost in aluminum pans (17.75 x 9.25 x 5 cm.) two species to a pan. When the plants had between 2 and 5 true leaves they were sprayed with an aqueous solution of the sodium salt of benzimidazole indicated in the following table at rates equivalent to 11.36, 5.68, 2.84, 1.42, 0.71, 0.35 and 0.18 kg. per hectare in 180 litres.

After seven days in a controlled environment room at 22° C. with 14 hours/day illumination of 300 meter candles and at 75–90% relative humidity, the plants were assessed for any herbicidal effect.

The herbicidal effect of the compounds was assessed as an average for the eight species, on a scale where 100 indicates complete kill and 0 indicates no herbicidal activity. The results are given in the following table.

| Rates in kg./hectare | \multicolumn{7}{c}{Average toxicity} |
|---|---|---|---|---|---|---|---|
|  | 11.36 | 5.68 | 2.84 | 1.42 | 0.7 | 10.35 | 0.18 |
| Compound: |  |  |  |  |  |  |  |
| 4,5-dichloro-2-trifluoromethylbenzimidazole | 84 | 81 | 79 | 72 | 57 | 53 |  |
| 4,6-dichloro-2-trifluoromethylbenzimidazole | 98 | 97 | 96 | 93 | 88 | 74 | 57 |
| 4-nitro-6-chloro-2-trifluoromethylbenzimidazole | 96 | 96 | 96 | 95 | 89 | 76 | 72 |
| 4-chloro-6-nitro-2-trifluoromethylbenzimidazole | 94 | 93 | 93 | 86 | 84 | 81 |  |
| 4,5,6,7-tetrachloro-2-trifluoromethylbenzimidazole | 72 | 71 | 66 | 62 | 53 |  |  |
| 4,5,6-trichloro-2-trifluoromethylbenzimidazole | 100 | 96 | 96 | 94 | 89 | 84 | 61 |
| 4,5,7-trichloro-2-trifluoromethylbenzimidazole | 89 | 84 | 75 | 73 | 71 | 67 | 70 |
| 5-chloro-2-trifluoromethylbenzimidazole | 86 | 78 | 76 | 65 | 58 |  |  |
| 4-chloro-2-trifluoromethylbendimidazole | 93 | 87 | 72 | 67 | 66 |  |  |
| 2,5-bi(trifluoromethyl)benzimidazole | 95 | 88 | 80 | 79 | 74 | 49 |  |
| 5-nitro-2-trifluoromethylbenzemidazole | 95 | 73 | 66 | 62 | 60 | 57 |  |
| 4,5,6-trichloro-2-pentafluoroethylbenzimidazole | 94 | 94 | 93 | 91 | 90 | 78 | 51 |
| 5-nitro-2-pentafluoroethylbenzimidazole | 96 | 93 | 91 |  |  |  |  |

EXAMPLE 24

Peas, mustard, linseed, barley, maize and ryegrass seed sown in John Innes No. 1 potting compost in which 5-nitro-2-trifluoromethylbenzimidazole had been incorporated at rates equivalent to 24 and 12 parts per million weight/volume of soil or equivalent to a surface application of 11.36 and 5.68 kilograms per hectare. The plants were grown in aluminum pans (17.75 cm. x 9.25 cm. x 5 cm.) one species to a pan.

After 21 days growth in a controlled environment room the plants were assessed for any herbicidal effects when it was found that the germination of mustard and linseed had been suppressed by both rates, the germination of ryegrass had been severely suppressed and the surviving plants were markedly stunted and incapable of normal growth, whilst peas, barley and maize were relatively unaffected.

EXAMPLE 25

Solutions containing 10, 3, 1, 0, 3 and 0.1 parts per million (weight by volume) of the compounds listed below were made in aerated distilled water. 100 milliliters aliquots of the solution were placed in screw cap glass jars, 4.5 centimeters diameter by 8.5 centimeters high, which just filled them to the brim. Five young specimens of the bilharzia vector snail, *Australorbis glabratus*, were then placed in each vessel and a perforated lid screwed on to prevent them leaving the water. After a 24 hour exposure period the snails were removed from the solutions of the compounds and placed in aerated distilled water for a further 48 hours recovery period, before an assessment of mortality was made.

The results obtained are summarized in the following table each value being the average of three replications.

|  | 5-chloro-2-trifluoromethyl-benzimidazole | | 4,5,6-trichloro-2-trifluoromethyl-benzimidazole | |
| --- | --- | --- | --- | --- |
|  | 50% | 95% | 50% | 95% |
| *Phytophthora palmivora* | <10 | <10 | <10 | 10 |
| *Alternaria solani* | <10 | 20 | <10 | 20 |
| *Botrytis fabae* | <10 | <10 | <10 | 10 |
| *Fusarium oxysporum* | <10 | 47 | <10 | 29 |
| *Verticilium albo atrum* | <10 | 13 | <10 | 30 |
| *Fomes annosus* | <10 | <10 | <10 | <10 |

| Compound | Percent mortality after 72 hours at— | | | | |
| --- | --- | --- | --- | --- | --- |
|  | 10 p.p.m. | 3 p.p.m. | 1 p.p.m. | 0.3 p.p.m. | 0.1 p.p.m. |
| 1. 4-bromo-5,6,7-trichloro-2-trifluoromethylbenzimidazole | 100 | 100 | 100 | 100 | 50 |
| 2. 4,6,7-trichloro-5-methyl-2-trifluoromethylbenzimidazole | 100 | 100 | 60 | 50 | 0 |
| 3. 4,5-dichloro-2-trifluoromethylbenzimidazole | 100 | 100 | 100 | 0 | 0 |
| 4. 4-nitro-6-chloro-2-trifluoromethylbenzimidazole | 100 | 100 | 100 | 0 | 0 |
| 5. 4,5,6-trichloro-2-trifluoromethylbenzimidazole | 100 | 100 | 100 | 30 | 0 |
| 6. 4,6,7-trichloro-2-trifluoromethylbenzimidazole | 100 | 100 | 60 | 0 | 0 |
| 7. 4,5,6,7-tetrachloro-2-trifluoromethylbenzimidazole | 100 | 100 | 80 | 0 | 0 |

These results indicate that each compound possesses a marked molluscicidal activity.

EXAMPLE 26

An insecticidal composition was prepared by grinding together 100 parts of 4.7-dichloro-2-trifluoromethylbenzimidazole, 200 parts of chalk and 50 parts of sorbitan mono-oleate forming a wettable powder. This wettable powder was dispersed in water and sprayed or painted onto walls giving a long residual insecticidal effect.

EXAMPLE 27

A molluscicidal composition was prepared by admixing 100 parts of diesel oil, 5 parts of 4-bromo-5,6,7-trichloro-2-trifluoromethylbenzimidazole and 2 parts of oleic acid so as to form an oil solution. This oil was sprayed onto water surfaces and spread over the water allowing the active ingredient to dissolve therein.

EXAMPLE 28

9 centimeters diameter filter paper in 9 centimeters crystallizing dishes were treated with 1 millimeter portions of acetone solutions of 4,7-dichloro-2-trifluoromethylbenzimidazole at concentrations giving deposits equivalent to 1087, 108.7, 10.87 and 5.44 mg./square meter. Batches of female house flies (*Musca domestica*) lightly anaesthetized with carbon dioxide, were introduced into the dishes after the solvent had evaporated, and a glass lid was placed over each dish. After 24 hours the dishes were examined and it was found that there was a complete kill of flies at all four concentrations. Flies maintained under similar conditions in the absence of the chemical were unaffected.

EXAMPLE 29

11 grams of 3-amino-5-mercapto-ortho-phenylenediamine dihydrochloride were refluxed for eight hours with 12 milliliters of trifluoroacetic acid. The solid product comprising 2-trifluoromethyl-4-trifluoroacetamido-6-mercapto benzimidazole was filtered off, washed with a little trifluoroacetic acid and recrystallized from benzene giving 4 grams of the crystalline product of melting point 229–231° C.

EXAMPLE 30

Nutrient medium known as potato-dextrose agar medium was made up in molten condition with incorporation of compounds of the invention at various concentration levels. The medium was then allowed to set in petri dishes and plugs of actively growing mycelium of the fungi listed below were placed on the plates. The concentrations which were found to restrict growth to (a) 50%, (b) 95% that observed in control plates are recorded.

EXAMPLE 31

The compound 4,5,7-trichloro-2-trifluoromethyl benzimidazole was ground in presence of equal weight of china clay and 10% of sorbitan mono oleate to give a wettable powder and this was suspended in water to give various concentrations of active ingredients and then sprayed to run-off on cucumber leaves which were subsequently dusted with spores of the mildew *Erysiphe cichoracearum*. Development of the fungus in comparison with that on untreated leaves is recorded.

Concentrations, p.p.m.: Percent developed
500 ----- 3
250 ----- 10
125 ----- 30
62 ----- 55
31 ----- 90

EXAMPLE 32

25 parts of 4,5,6 - trichloro-2-trifluoromethylbenzimidazole, 3.35 parts of sodium hydroxide and 100 parts of water were found to form a clear aqueous solution of the sodium salt which did not deposit crystals above 0° C. This solution was evaporated and on cooling crystalline 4,5,6-trichloro-2-trifluoromethyl benzimidazole, sodium, salt, was obtained.

*Analysis.*—Found (percent): C, 30.75; H, 0.39; N, 9.06; Cl, 33.98; F, 18.16; Na, 7.42. $C_8HN_2Cl_3F_3Na$ (percent): C, 30.85; H, 0.32; N, 9.0; Cl, 34.16; F, 18.30; Na, 7.38.

EXAMPLE 33

30 parts of 2,5-di-(trifluoromethyl)benzimidazole, 30 parts of industrial ethyl alcohol, 4.8 parts of sodium hydroxide and 80 parts of water were found to form a clear aqueous solution which on cooling deposited crystals of the sodium salt.

*Analysis.*—Found (percent): F, 41.10; Na, 8.45. $C_9H_3F_6N_2Na$ (percent): F, 41.29; Na, 8.33.

EXAMPLE 34

29 parts of 4,5,7-trichloro-2-trifluoromethyl benzimidazole were dissolved with agitation in 100 parts of a 10% solution of trimethylamine in water giving an aqueous solution of the trimethylamine salt of 4,5,7-trichloro-2-trifluoromethyl benzimidazole.

EXAMPLE 35

22 parts of 5-chloro-2-trifluoromethyl benzimidazole, 6 parts of potassium hydroxide, 30 parts of methyl alcohol, and 70 parts of water were heated together giving a clear solution which on partial evaporation and cooling deposited crystals of the potassium salt of 5-chloro-2-trifluoromethyl benzimidazole.

*Analysis.*—Found (percent): C, 37.21; H, 1.19; N, 10.86; Cl, 13.93. K, 14.77. $C_8H_3ClF_3N_2K$ requires (percent): C, 37.15; H, 1.17; N, 10.83; Cl, 13.89; K, 15.09.

EXAMPLE 36

23.1 grams of 5-nitro-2-trifluoromethylbenzimidazole were dissolved in 250 milliliters of absolute alcohol, Adams platinum catalyst was added and hydrogen passed through until 3 mols of hydrogen had been absorbed and the solution which was initially red-brown turned green. The alcohol was removed by vacuum distillation at 80° C. to give a black oily residue, which was dissolved in 40 milliliters of anhydrous ether and dry hydrogen chloride gas was passed through until precipitation was complete. The solid was filtered off, washed with ether, dried and recrystallized from concentrated hydrochloric acid to give 20 grams of 5-amino-2-trifluoromethylbenzimidazole dihydrochloride. (Melting point 262° C. with decomposition.)

*Analysis.*—Found (percent): C, 34.80; H, 3.05; Cl, 25.75; N, 15.40. $C_8H_8Cl_2F_3N_3$ requires (percent): C, 35.04; H, 2.92; Cl, 25.91; N, 15.33.

EXAMPLE 37

To a mixture of 15.5 grams of 4,5,6-trichloro-2-trifluoromethylbenzimidazole and 9 millilitres of concentrated sulphuric acid were added 18 milliliters of fuming nitric acid in 1 millilitre portions. When the initial reaction had subsided the mixture was refluxed on an oil bath for one hour. The mixture was cooled and poured onto ice, the precipitate filtered off, washed with water, dried and recrystallized from benzene giving 12.8 grams of 4,5,6-trichloro-7-nitro - 2 - trifluoromethylbenzimidazole (melting point 221–223° C.).

*Analysis.*—Found (percent): C, 28.80; H, 0.30; Cl, 31.35; N, 12.55. $C_8HCl_3F_3N_3O_2$ requires (percent): C, 28.73; H, 0.30; Cl, 31.79; N, 12.56.

4,6,7-trichloro - 5-nitro-2-trifluoromethylbenzimidazole (melting point 225° C.) was prepared in a similar way.

EXAMPLES 38–56

In analogous manner to Example 4, the following compounds were prepared:

4-nitro-5-bromo-2-trifluoromethylbenzimidazole
  (M.P. 119–121° C.)

5-chloro-6-nitro-2-trifluoromethylbenzimidazole
  (M.P. 197–198° C.)
4,5,7-tribromo-2-trifluoromethylbenzimidazole
  (M.P. 216–218° C.)
4-nitro-2-trifluoromethylbenzimidazole
  (M.P. 145–146° C.)
4,6-dibromo-2-trifluoromethylbenzimidazole
  (M.P. 181–182° C.)
4-bromo-6-chloro-2-trifluoromethylbenzimidazole
  (M.P. 168° C.)
5-bromo-2-trifluoromethylbenzimidazole
  (M.P. 139.5–141° C.)
4-chloro-6-bromo-2-trifluoromethylbenzimidazole
  (M.P. 194° C.)
5-iodo-2-trifluoromethylbenzimidazole
  (M.P. 222–224° C.)
4-bromo-6-nitro-2-trifluoromethylbenzimidazole
  (M.P. 215–216° C.)
4,6-dinitro-2-trifluoromethylbenzimidazole
  (M.P. 159–160° C.)
4-nitro-6-bromo-2-trifluoromethylbenzimidazole
  (M.P. 165–167° C.)
4-bromo-2-trifluoromethylbenzimidazole
  (M.P. 151–153° C.)
4,5,6,7-tetrabromo-2-trifluoromethylbenzimidazole
  (M.P. 267–269° C.)
4,6-diiodo-2-trifluoromethylbenzimidazole
  (M.P. 195° C.)
4,6,7-trichloro-5-bromo-2-trifluoromethylbenzimidazole
  (M.P. 276° C.)
5-chloro-6-nitro-2-trifluoromethylbenzimidazole
  (M.P. 197–198° C.)
4,6,7-trichloro-5-fluoro-2-trifluoromethylbenzimidazole
  (M.P. 246–248° C.)
4,6-dibromo-5,7-dichloro-2-trifluoromethylbenzimidazole
  (M.P.) 252° C.).

EXAMPLES 57–59

An acetone solution of the compound was sprayed onto 7 cm. diameter discs of cabbage leaf at such a concentration and volume as to produce deposits of 65, 13 and 6.5 micrograms/sq. cm. After the solvent had evaporated the discs were placed in 9 cm. diameter petri dishes and infested with ten second instar larvae of the cabbage white butterfly—*Pieris brassicae*. The mortalities obtained after 48 hours exposure are summarized in the following table.

| | Compound | Percent mortality at— | | |
|---|---|---|---|---|
| | | 65[1] | 13[1] | 6.5[1] |
| 57 | 4-bromo-2-trifluoromethylbenzimidazole | 100 | 90 | 60 |
| 58 | 4,5,6,7-tetra-bromo-2-trifluoromethylbenzimidazole | 100 | 100 | 100 |
| 59 | 4,6-di-iodo-2-trifluoromethylbenzimidazole | 100 | 40 | 0 |

[1] Micrograms per square centimeter.

EXAMPLES 60–61

Acetone concentrates of the compounds were diluted in water to give solutions containing 1000, 300 and 100 parts per million (p.p.m.) of active ingredient. 2 cm. diameter discs of french bean leaf (*Phaseolus vulgaris*) were sprayed with the solution which were then placed in moist filter papers and immediately infested with 20 adult red spider mites—*Tetranychus telarius*. The discs were examined after 48 hours when the mortality was recorded. The results are summarized in the table below.

| | Compound | Percent mortality at— | | |
|---|---|---|---|---|
| | | 1,000 p.p.m. | 300 p.p.m. | 100 p.p.m. |
| 60 | 4,6-di-iodo-2-trifluoromethylbenzimidazole | 100 | 100 | 100 |
| 61 | 5-bromo-4-nitro-2-trifluoromethylbenzimidazole | 100 | 100 | 100 |

EXAMPLES 62–63

Acetone concentrates of the compounds were added to whole-meal flour to produce concentrations of 300 and 100 p.p.m. wt. of compound per wt. of flour. The treated flour was placed in small glass specimen tubes (3″ x 1″) and 10 adult flour beetles *Tribolium confusum* added to each. After 10 days incubation at 25° C. and 60% relative humidity the mortality of the beetles was assessed. The results given in the following table.

| Compound | Percent mortality at— | |
|---|---|---|
| | 300 p.p.m. | 100 p.p.m. |
| 62 ........ 4,6-di-iodo-2-trifluoromethylbenzimidazole .................. | 100 | 40 |
| 63 ........ 4,5,6,7-tetra-bromo-2-trifluoromethylbenzimidazole ........ | 100 | 100 |

EXAMPLE 64

9 cm. filter papers were treated with an acetone solution of 4-bromo-2-trifluoromethylbenzimidazole such as to produce deposits equivalent to 300, 100 and 30 milligrams per square foot. When the solvent had evaporated the filter papers were placed in crystallizing dishes (9 x 4 cms.) together with about 50 adult female houseflies, *Musca domestica*. After 24 hours exposure the treatments were examined when it was found that all rates had given complete kill of the insects.

EXAMPLES 65–68

Peas (*Psuma sativum*), mustard (*Sinapis alba*), linseed (*Linum usitatissimum*), beet (*Beta vulgaris*), buckwheat (*Fagopyrum esculentum*), and barley (*Hordeum vulgare* var. "*Proctor*") were grown in small aluminum pans (7½" x 3¾" x 2"), containing John Innes No. 1 potting compost—two species to a pan. When the plants were about 2–3" high and the first true leaves had fully expanded they were sprayed with acetone/water solutions or suspensions of the compounds indicated below at rates equivalent to 10 and 1¼ lbs. active ingredient in 80 gallons/acre. After 7 days growth in a controlled environment room (22° C.; 14 hours artificial illumination per day at 1200 ft. candles) the activity of the compounds against each species was assessed according to a herbicidal index where 0=no effect and 100=complete kill. The results are summarized in the following table.

onto 2 cm. discs of French bean leaves mounted on wet filter paper and the discs were then covered with adults of greenhouse red spider mite (*Tetranychus telarius*). With every compound a complete kill of the mites are obtained within 24 hours at both concentrations.

(72) 5-nitro-2-trifluoromethylbenzimidazole,
(73) 4,5,6-trichloro-2-trifluoromethylbenzimidazole,
(74) 6-chloro-4-nitro-2-trifluoromethylbenzimidazole.

EXAMPLES 75–85

An acetone solution of each of the substituted benzimidazole indicated below was sprayed onto 7 cm. discs of cabbage leaves so as to give coatings of 3 micrograms of active ingredient per square centimeter. After the solvent had evaporated the discs were placed in 9 cm. petri dishes and each infested with ten second instar larvae of the cabbage-white butterfly (*Pieris brassicae*). With every compound a complete kill of the larvae was obtained within 24 hours.

(75) 4-chloro-2-trifluoromethyl benzimidazole,
(76) 5-cyano-2-trifluoromethylbenzimidazole,
(77) 5,6-dichloro-2-trifluoromethylbenzimidazole,
(78) 4,7-dichloro-2-trifluoromethylbenzimidazole,
(79) 4,7-dibromo-2-trifluoromethylbenzimidazole,
(80) 6-chloro-4-nitro-2-trifluoromethylbenzimidazole,
(81) 5-chloro-6-nitro-2-trifluoromethylbenzimidazole,

| Compound | Rate lb./acre | Herbicidal activity | | | | | | Average toxicity |
|---|---|---|---|---|---|---|---|---|
| | | Peas | Mustard | Linseed | Buckwheat | Sugarbeet | Barley | |
| 65 ...... 5-bromo-4-nitro-2-trifluoromethylbenzimidazole .... | 10 | 85 | 100 | 100 | 100 | 100 | 35 | 87 |
| | 1¼ | 75 | 98 | 90 | 15 | 100 | 10 | 65 |
| 66 ...... 5-cyano-2-trifluoromethylbenzimidazole ........... | 10 | 45 | 100 | 100 | 100 | 100 | 8 | 76 |
| | 1¼ | 5 | 99 | 95 | 100 | 100 | 0 | 67 |
| 67 ...... 5-bromo-2-trifluoromethylbenzimidazole .......... | 10 | 90 | 100 | 100 | 100 | 100 | 75 | 94 |
| | 1¼ | 25 | 95 | 100 | 100 | 100 | 25 | 74 |
| 68 ...... 4-bromo-5-nitro-2-trifluoromethylbenzimidazole .... | 10 | 50 | 100 | 100 | 100 | 100 | 60 | 85 |
| | 1¼ | 18 | 85 | 98 | 100 | 100 | 20 | 70 |

EXAMPLES 69–71

Sees of peas (*P. sativum*), mustard (*S. alba*), linseed (*L. usitatissimum*), maize (*Zea mays*), barley (*H. vulgare*), and ryegrass (*Lolium sp.*) were sown in small aluminum pans containing John Innes No. 1 potting compost into which had previously been mixed the compounds indicated below at a rate of 24 p.p.m. (wt. of active ingredient per vol. of soil equivalent to an application of 10 lbs./acre mixed to depth of soil in pans). After 22 days growth in a controlled environment room (22° C.; 14 hours light per day) the plants were examined for sign of herbicidal activity. Damage was assessed on an index where 0=no effect and 10=complete kill. The results are summarized in the following table:

(82) 4,5,6-trichloro-2-trifluoromethylbenzimidazole,
(83) 4,6,7-trichloro-2-trifluoromethylbenzimidazole,
(84) 5-fluoro-4,6,7-trichloro-2-trifluoromethylbenzimidazole,
(85) 5-bromo-4,6,7-trichloro-2-trifluoromethylbenzimidazole.

EXAMPLES 86–90

9 centimeter diameter filter papers were treated with acetone solutions of the substituted benzimidazole indicated below and when the solvent had evaporated, were placed in crystallizing dishes (9 cm. x 4 cm.). The con-

| Compound | Rate lb./acre | Herbicidal index | | | | | | Average toxicity |
|---|---|---|---|---|---|---|---|---|
| | | Peas | Mustard | Linseed | Maize | Barley | Ryegrass | |
| 69 ........ 5-cyano-2-trifluoromethylbenzimidazole ........... | 10 | 85 | 100 | 100 | 45 | 35 | 80 | 74 |
| 70 ........ 5-bromo-2-trifluoromethylbenzimidazole .......... | 10 | 24 | 100 | 100 | 0 | 13 | 49 | 48 |
| 71 ........ 4-bromo-6-nitro-2-trifluoromethylbenzimidazole .... | 10 | 0 | 100 | 100 | 75 | 60 | 90 | 71 |

EXAMPLES 72–74

An acetone concentrate of each of the substituted benzimidazole indicated below was diluted in water to give solutions containing 30 and 100 parts per million (p.p.m.) of active ingredient. These solutions were sprayed centrations of the solutions were adjusted so that 1 millilitre aliquots deposited on the papers produced deposits equivalent to 300, 100 and 30 mg./sq. foot.

Adult female houseflies (*Musca domestica*), lightly anaesthetized with carbon dioxide were then introduced into the dishes and a glass lid placed over each. When examined after 24 hours, all treatments were found to have given a complete kill of the insects.

(86) 4-chloro-2-trifluoromethylbenzimidazole,
(87) 4-nitro-2-trifluoromethylbenzimidazole,
(88) 4,7-dichloro-2-trifluoromethylbenzimidazole,
(89) 6-chloro-4-nitro-2-trifluoromethylbenzimidazole,
(90) 6-bromo-4-nitro-2-trifluoromethylbenzimidazole.

EXAMPLES 91–93

Acetone solutions of the benzimidazole indicated below were added to flour at rates giving 300, 100 and 30 p.p.m. weight of active ingredient per weight of flour. After the solvent had evaporated, the flour at each level of concentration was thoroughly mixed. Portions of the treated flour were placed in glass tubes (7.5 cm. x 2.5 cm.) and ten adult flour beetles (*Tribolium confusum*) added to each tube. After 5 days all treatments with all the compounds were found to have given a complete kill of the beetles.

(91) 4,6,7-trichloro-2-trifluoromethylbenzimidazole,
(92) 5-fluoro-4,6,7-trichloro-2-trifluoromethylbenzimidazole,
(93) 5-bromo-4,6,7-trichloro-2-trifluoromethylbenzimidazole.

EXAMPLES 94–99

The substituted benzimidazoles indicated below were formulated into wettable powders of the following composition.

| | Percent |
|---|---|
| Substituted benzimidazole | 25 |
| Dispersing agent (Dyapol PT) | 5 |
| Wetting agent (Hoe S2/268) | 1 |
| China clay | 62 |

The compositions were suspended in water and sprayed onto copy paper so as to give deposits of the substituted benzimidazole of 30 mg., 10 mg. and 3 mg. per square foot.

Adult female mosquitoes (*Aedes aegypti*) were transferred to cages using this copy paper as the floor and were then removed to normal storage cages after 1, 2 and 4 hours exposure. Mortalities were assessed 24 hours, and are given in the following table, expressed as percent kill.

| | | Mortalities at— | | |
|---|---|---|---|---|
| Compound | Exposure time, hrs. | 30 mg. per sq. ft. | 10 mg. per sq. ft. | 3 mg. per sq. ft. |
| 4,7-dichloro-2-trifluoromethylbenzimidazole | 1 2 3 | 0 63 100 | | |
| 6-chloro-4-nitro-2-trifluoromethylbenzimidazole | 1 | 100 | 100 | 100 |
| 4-chloro-2-trifluoromethylbenzimidazole | 1 2 | 83 100 | | |
| 4-nitro-2-trifluoromethylbenzimidazole | 1 2 | 71 100 | | |
| 6-bromo-2-trifluoromethylbenzimidazole | 1 | 100 | | |
| 6-bromo-4-nitro-2-trifluoromethylbenzimidazole | 1 | 100 | 100 | 100 |

EXAMPLES 100–105

Filter papers were treated with aqueous sugar solutions containing the sodium salt of the substituted benzimidazole indicated below, so as to give a deposit of the active ingredient of 100 mg./sq. foot.

Adult houseflies (*Musca domestica*) were transferred to cages containing this filler paper on the floor, and left for 24 hours, and mortality observed. In each case 100% mortality was obtained. The papers were stored in the open and at intervals the papers were tested again, to determine the number of days storage required for the mortality to fall to 50%. This persistence time in days is given in the following table.

| Compound: | Persistence time, days |
|---|---|
| 4,7-dichloro-2-trifluoromethylbenzimidazole | 43 |
| 6-chloro-4-nitro-2-trifluoromethylbenzimidazole | 56 |
| 4-chloro-2-trifluoromethylbenzimidazole | 26 |
| 4-nitro-2-trifluoromethylbenzimidazole | 20 |
| 6-bromo-2-trifluoromethylbenzimidazole | 20 |
| 6-bromo-4-nitro-2-trifluoromethylbenzimidazole | Over 57 |

EXAMPLES 106–107

Absorbent cotton wool pads (approximately 9 centimeters diameter by 1 centimeter thickness) were placed in petri dishes (9 centimeter diameter) and soaked with 10 millilitres of a solution containing 0.1% of the sodium salt of the substituted benzimidazole indicated below and 5% of glucose. Other pads were prepared using glucose and water only. The pads were placed in cages (12 x 12 x 12 inches) containing a mixed population of about 100 flies. The cages contained either one treated and one untreated pad or two untreated pads. When the cages were examined after 16 hours all the flies in those containing a treated pad were found to have been killed, as compared with no kill in the control cages. The pads were then removed and after moistening with distilled water to replace evaporation losses placed in a second series of cages. Again after 16 hours all flies in those containing the treated pads were found to have been killed. The experiment was continued for one month during which time the treated pads always gave a complete kill during the exposure period.

In a separate experiment, a treated pad only was placed in a cage containing a mixed population of flies, the cage being provided with an operating armhole. The flies were kept under observation and as soon as one had been seen to probe the pad with its proboscis for 30 seconds it was transferred to a separate storage cage. The flies were all found to be dead when observed four hours after transfer.

(106) 4,7-dichloro-2-trifluoromethylbenzimidazole.
(107) 4-nitro-6-chloro-2-trifluoromethylbenzimidazole.

EXAMPLE 108

A suspension containing 1 part of 6-bromo-4-nitro-2-trifluoromethylbenzimidazole in 1000 parts of water was prepared by diluting a 20% solution in acetone with a 0.05% solution of octyl creosol polyethylene oxide condensate in water. This was further diluted to give suspension containing 600, 300 and 100 p.p.m. of active compound and these were sprayed at a rate equivalent to 50 gals./acre on young field beans (*Vicia faba*) infested with adult apterous vetch aphids (*Megoura viciae*). After treatment the plants were enclosed in glass cages with gauze tops for ventilation. All treatments produced complete kill of the aphids in 24 hours as compared with no kill on control plants.

EXAMPLES 109–117

0.1 gram of each of the substituted benzimidazole indicated below were dissolved in 20 milliliters of ethylene glycol monomethyl ether. This solution was stirred at room temperature with 400 milliliters of water. 10 grams of previously well wetted wool flannel were introduced into this liquor and, with good agitation, the liquor was heated to 90° C. for 15 minutes. Then 80% formic acid in amount comprising 2% of the flannel was added, and the flannel agitated in the liquor for another 30 minutes at the same temperature. The bath was then cooled and the treated wool flannel well rinsed under running tap water, centrifuged and dried.

The dried flannel was then tested as to fastness against *Tineolla bisseliella* (moth) caterpillars and larvae of *Attagenus piceus* and *Anthrenus vorax* by the methods set out in the Swiss Association for Standardization leaflets No. 95,901 and 95,902. This was done by exposing 4 pieces cut for example, from the material of the same size to attack by the caterpillars or larvae for 14 days under constant temperature and humidity conditions (28° C./65% humidity). Fifteen caterpillars or larvae were placed on each piece of material. The facts determined by the test were as follows:

(a) The number surviving out of thirty caterpillars or larvae.
(b) The average relative loss in weight of the pieces of material calculated on an untreated sample of the same size under the same conditions.

With every compound, there was a complete kill of the caterpillars or larvae, and the loss in weight of the fibre was in the range 0–5%. With the control samples, all thirty caterpillars or larvae were alive, and the loss in weight of the fibre was in the range 50–100%.

(109) 2,5-bis-trifluoromethylbenzimidazole,
(110) 2-trifluoromethyl-4-nitro-6-chlorobenzimidazole,
(111) 2-trifluoromethyl-4,7-dichloro-benzimidazole,
(112) 2-trifluoromethyl-4,5,6-trichloro-benzimidazole,
(113) 2-trifluoromethyl-4,5,7-trichloro-benzimidazole,
(114) 2-trifluoromethyl-4,5,6,7-tetrachloro-benzimidazole,
(115) 2-trifluoromethyl-4,7-dibromo-benzimidazole,
(116) 2-trifluoromethyl-4,7-dibromo-5-chloro-benzimidazole,
(117) 2,5-bis-trifluoromethyl-6-chloro-benzimidazole.

EXAMPLES 118–127

Two parts of each of the substituted benzimidazoles indicated below were incorporated into 98 parts of a usual commercial light duty detergent for textiles which comprises, for example, 20 to 30% sodium dodecylbenzene sulphonate or sodium lauryl alcohol sulphate, 5 to 10% sodium tripolyphosphate or sodium ethylenediamine tetraacetate, and 60 to 75 parts of sodium sulphate. A washing liquor was prepared which contained 2.5% of the light duty detergent mixed with the substituted benzimidazole and wool flannel was washed therein at 34–40° C. (liquor to wool ratio 20:1). The washed wool sample was then rinsed with cold water, centrifuged and dried.

The dried sample was then tested as to fastness against *Tineolla bisseliella* (moth) caterpillars and larvae of *Attagenus piceus* and *Anthrenus vorax* by the methods set out in the Swiss Association for Standardization leaflets No. 95,901 and 95,902. This was done by exposing 4 pieces cut from the material of the same size to attack by the caterpillars or larvae for 14 days under constant temperature and humidity conditions (28° C./65% humidity). Fifteen caterpillars for larvae were placed on each piece of material.

The facts determined by the test were as follows:

(a) The number surviving out of thirty caterpillars or larvae.
(b) The average relative loss in weight of the pieces of material calculated on an untreated sample of the same size under the same conditions.

With every compound, there was a complete kill of the caterpillars or larvae and the loss in weight of the fibre was 0–5%. With the control samples, all thirty caterpillars or larvae were alive and the loss in weight of the fibre was in the range 50–100%.

Similar results were also obtained where the wool was dry cleaned with dry cleaning solvents which contain corresponding amounts of the substituted benzimidazole indicated below.

(118) 2-trifluoromethyl-4,5,6-trichloro-7-bromobenzimidazole,
(119) 2-trifluoromethyl-4,7-dichloro-benzimidazole,
(120) 2-trifluoromethyl-4,5,6-trichloro-benzimidazole,
(121) 2-trifluoromethyl-4,5,7-trichloro-benzimidazole,
(122) 2-trifluoromethyl-4,7-dibromo-benzimidazole,
(123) 2,5-bis-trifluoromethylbenzimidazole,
(124) 2-trifluoromethyl-4-nitro-6-chlorobenzimidazole,
(125) 2-trifluoromethyl-4,5,6,7-tetrachloro-benzimidazole,
(126) 2-trifluoromethyl-4,7-dibromo-5-chloro-benzimidazole,
(127) 2,5-bis-trifluoromethyl-6-chloro-benzimidazole.

What is claimed is:
1. A compound of the formula

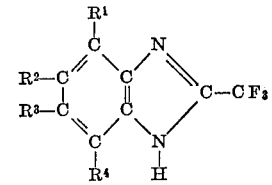

wheerin $R^1$, $R^2$, $R^3$ and $R^4$ are the same or different and are selected from the group consisting of chloro, bromo and hydrogen, not more than two of $R^1$, $R^2$, $R^3$ and $R^4$ representing hydrogen and at least one of said groups being chloro.
2. 5,6-dichloro-2-trifluoromethylbenzimidazole.
3. 4,5-dichloro-2-trifluoromethylbenzimidazole.
4. 4,5,6-trichloro-2-trifluoromethylbenzimidazole.
5. 4,6-diiodo-2-trifluoromethylbenzimidazole.

References Cited

UNITED STATES PATENTS

| | | | |
|---|---|---|---|
| 3,528,798 | 9/1970 | Pfeiffer | 260—309.2 |

FOREIGN PATENTS

| | | | |
|---|---|---|---|
| 6410413 | 3/1965 | Netherlands | 260—309.2 |
| 1,170,737 | 11/1969 | Great Britain | 260—309.2 |
| 1,430,139 | 1/1966 | France | 260—309.2 |
| 659,384 | 8/1965 | Belgium | 260—309.2 |
| 1,144,620 | 3/1969 | Great Britain | 260—309.2 |

OTHER REFERENCES

Morgan: J. Chem. Soc. (London), 1961, pp. 2344–5 relied on.

Brooke et al.: J. Chem. Soc. (London), 1961, pp. 802–7.

Fara et al.: Bollettino Dell Instituto Sieroterapico Milanese, vol. 42, No. 11–12, pp. 630–37 (1963).

Conant et al.: The Chemistry of Organic Compounds, 3rd ed. pp. 24–5, New York, Macmillan, 1947.

Latimer et al.: Reference Book of Inorganic Chemistry, p. 152, New York, Macmillan, 1940.

Noller: Chemistry of Organic Compounds, 2nd ed., pp. 432–38, Philadelphia, Saunders, 1958.

NATALIE TROUSOF, Primary Examiner

U.S. Cl. X.R.

424—273